US010642591B2

(12) United States Patent
Ow et al.

(10) Patent No.: US 10,642,591 B2
(45) Date of Patent: May 5, 2020

(54) SYSTEM FOR INSTALLING SOFTWARE ON A SMALL-MEMORY DEVICE

(71) Applicant: Home Control Singapore Pte. Ltd., Singapore (SG)

(72) Inventors: Tong Peow Ow, Singapore (SG); Ching Guan Tay, Singapore (SG)

(73) Assignee: Home Control Singapore PTE. LTD., Singapore (SG)

( * ) Notice: Subject to any disclaimer, the term of this patent is extended or adjusted under 35 U.S.C. 154(b) by 0 days.

(21) Appl. No.: 15/304,684

(22) PCT Filed: Jun. 10, 2015

(86) PCT No.: PCT/SG2015/000130
§ 371 (c)(1),
(2) Date: Oct. 17, 2016

(87) PCT Pub. No.: WO2015/190998
PCT Pub. Date: Dec. 17, 2015

(65) Prior Publication Data
US 2017/0083304 A1    Mar. 23, 2017

(30) Foreign Application Priority Data

Jun. 11, 2014  (EP) ..................................... 14171873

(51) Int. Cl.
*G06F 8/61*    (2018.01)
*G06F 9/4401*  (2018.01)
*H04L 29/08*   (2006.01)

(52) U.S. Cl.
CPC .............. *G06F 8/61* (2013.01); *G06F 9/4408* (2013.01); *H04L 67/34* (2013.01)

(58) Field of Classification Search
CPC ..... G06F 8/61; G06F 9/4408; G06F 8/60–656
See application file for complete search history.

(56) References Cited

U.S. PATENT DOCUMENTS 4,503,533 A * 3/1985 Tobagi ................ H04L 12/4013
                                                    370/445
5,828,887 A * 10/1998 Yeager ................... G06F 9/445
                                                    709/220

(Continued)

OTHER PUBLICATIONS

Gracioli et al., "An Operating System Infrastructure for Remote Code Update in Deeply Embedded Systems", published by ACM, HotSWUp'08, Oct. 20, 2008, Nashville, Tennessee, USA., pp. 1-5 (Year: 2008).*

(Continued)

*Primary Examiner* — Thuy Dao
*Assistant Examiner* — Zheng Wei
(74) *Attorney, Agent, or Firm* — Hamilton, Brook, Smith & Reynolds, P.C.

(57) ABSTRACT

A system (100) enables installation of a computer program on a (small-memory) device (110). The system comprises the device and a host device (180). The host device is arranged for sending data packets. At least some of the data packets comprise respective portions of the computer program. The device has a program memory (130) for containing the computer program, a boot memory (120) having a boot loader, and a processor (150). The boot loader is also arranged for installing the computer program. The boot loader comprises: detecting a data packet, extracting (a) a portion of the computer program and portion metadata and/or (b) program metadata, determining a memory location in the program memory based on said portion metadata, maintaining progress information representing extracted portions stored in the program memory, and determining completion of storing the collection of portions based on the progress information and the program metadata.

6 Claims, 7 Drawing Sheets

(56) References Cited

U.S. PATENT DOCUMENTS

| | | | | |
|---|---|---|---|---|
| 6,252,880 | B1* | 6/2001 | Hanna | H04L 49/351 370/425 |
| 6,269,398 | B1* | 7/2001 | Leong | H04L 41/0213 703/21 |
| 6,698,017 | B1* | 2/2004 | Adamovits | G06F 8/67 717/168 |
| 7,055,146 | B1* | 5/2006 | Durr | G06F 9/44521 717/162 |
| 7,065,347 | B1 | 6/2006 | Vikse et al. | |
| 7,171,606 | B2* | 1/2007 | Blackburn | G06Q 20/3552 714/763 |
| 7,287,068 | B1* | 10/2007 | Eriksson | G06F 8/65 709/219 |
| 7,673,297 | B1* | 3/2010 | Arsenault | G06F 8/65 717/168 |
| 7,903,267 | B2* | 3/2011 | Yasui | G06F 3/1204 358/1.13 |
| 7,926,051 | B2* | 4/2011 | Barta | G06F 8/61 717/174 |
| 8,359,373 | B2* | 1/2013 | Rofougaran | H04M 1/72527 709/220 |
| 8,429,336 | B2* | 4/2013 | Aida | G06F 8/654 711/103 |
| 8,555,273 | B1* | 10/2013 | Chia | G06F 8/665 717/168 |
| 8,607,222 | B2* | 12/2013 | Lee | H04W 8/245 717/168 |
| 8,752,039 | B1* | 6/2014 | Bapat | G06F 8/65 717/171 |
| 8,880,049 | B2* | 11/2014 | Furuta | G06F 8/65 455/418 |
| 9,134,994 | B2* | 9/2015 | Patel | G06F 8/20 |
| 9,294,606 | B2* | 3/2016 | Zhou | H04M 1/72525 |
| 9,342,316 | B1* | 5/2016 | Sivertsen | G06F 9/4406 |
| 2002/0080771 | A1* | 6/2002 | Krumel | H04L 29/06 370/352 |
| 2002/0083331 | A1* | 6/2002 | Krumel | H04L 29/06 726/3 |
| 2003/0074658 | A1* | 4/2003 | Kim | G06F 8/65 717/168 |
| 2004/0015952 | A1* | 1/2004 | Lajoie | G06F 8/65 717/171 |
| 2004/0098715 | A1* | 5/2004 | Aghera | G06F 8/65 717/173 |
| 2004/0139336 | A1* | 7/2004 | McLean | H04L 9/12 713/189 |
| 2004/0168165 | A1* | 8/2004 | Kokkinen | G06F 8/68 717/168 |
| 2004/0193998 | A1* | 9/2004 | Blackburn | G06Q 20/3552 714/763 |
| 2005/0102665 | A1* | 5/2005 | Barta | G06F 8/61 717/174 |
| 2005/0102666 | A1* | 5/2005 | Barta | G06F 8/61 717/174 |
| 2005/0102667 | A1* | 5/2005 | Barta | G06F 8/61 717/174 |
| 2007/0055969 | A1* | 3/2007 | Yang | G06F 8/65 717/168 |
| 2007/0097400 | A1* | 5/2007 | Yasui | G06F 3/1204 358/1.13 |
| 2008/0250126 | A1* | 10/2008 | Stohr | G06F 8/65 709/221 |
| 2010/0180108 | A1 | 7/2010 | Liu | |
| 2011/0004871 | A1 | 1/2011 | Liu | |
| 2011/0019774 | A1* | 1/2011 | Furuta | G06F 8/65 375/340 |
| 2011/0307879 | A1* | 12/2011 | Ishida | G06F 8/68 717/170 |
| 2013/0024850 | A1* | 1/2013 | Nutaro | G06F 8/68 717/169 |
| 2013/0117766 | A1* | 5/2013 | Bax | G06F 9/4405 719/323 |
| 2014/0019602 | A1* | 1/2014 | Murthy | H04L 67/1027 709/223 |
| 2014/0310698 | A1* | 10/2014 | Lee | G06F 8/654 717/168 |
| 2015/0169312 | A1* | 6/2015 | Patel | G06F 8/20 717/170 |
| 2015/0296072 | A1* | 10/2015 | Zhou | H04M 1/72525 455/414.1 |
| 2017/0131994 | A1* | 5/2017 | Middleton | G06F 8/65 |

OTHER PUBLICATIONS

International Search Report and Written Opinion of PCT/SG2015/000130 dated Dec. 23, 2015 entitled "System for Installing Software on a Small-Memory Device".

International Preliminary Report on Patentability for PCT/SG2015/000130 dated May 24, 2016 entitled "System for Installing Software on a Small-Memory Device".

http://www.zigbee.org/zigbee-for-developers/network-specifications/zigbeerf4ce/ ZigBee RF4CE; retrieved from Internet Jan. 18, 2017.

* cited by examiner

SYSTEM FOR INSTALLING SOFTWARE ON A SMALL-MEMORY DEVICE

This application is the U.S. National Stage of International Application No. PCT/SG2015/000130, filed Jun. 10, 2015, which designates the U.S., published in English, and claims priority under 35 U.S.C. §§ 119 or 365(c) to EP Application No. 14171873.4, filed Jun. 11, 2014. The entire teachings of the above applications are incorporated herein by reference.

FIELD OF THE INVENTION

The invention relates to wireless downloading and installing a computer program on a small-memory device. For example, the small-memory device may be an electronic device such as a remote control device that typically has a small memory compared to other more complex electronic devices such as a smart phone.

BACKGROUND OF THE INVENTION

A remote control device may use different technologies to interact with a consumer device. Well-known legacy infrared technology enables the remote control device to control a consumer device. The remote control device has an infrared transmitter to send an infrared signal comprising a command code whereas the consumer device has an infrared receiver to receive the infrared signal and to extract the command code. In response to the command code, the consumer device may perform an action. For example, the consumer device may be a TV and the remote control device is being used by a user to send a command code causing the TV to switch to the next channel or to raise the volume.

Contemporary remote control devices may (also) have a radio-based capability to interact with other devices in the home and to wirelessly download, from a host device, software updates for the remote control device. For example, the radio-based capability may based on ZigBee RF4CE technology (see also a website of ZigBee Alliance: http://www.zigbee.org/Specifications/ZigBeeRF4CE/Overview.aspx, as consulted on 22 May 2014). Software updates typically include firmware for the remote control device, including an up-to-date database of command cedes to interact with various devices. Said wireless downloading and installing of new software is commonly referred to as Over-the-Air Download (OAD). OAD can be used to receive and install software on the remote control device during the production process of the remote control device. A host device may establish a wireless connection with the remote control device, and then wirelessly send the software to the remote control device.

However, installing new software on the remote control in a high-volume production process is still a relatively inefficient process in a production process. This is particularly the case in a high-volume production process, such as a production process of remote control devices, wherein low cost and high speed of production are important. During installation of new software using OAD, the host device and the remote control device need to be shielded from other (remote control) devices in the vicinity in order to prevent interference, for example by using a shielding box. Each of the other remote control devices may be performing its own installation within its own shielding box, being paired with its own host device inside the shielding box. The use of a shielding box for each device performing its own software installation is cumbersome and limits the speed of the production process. Inefficiency of the production process is further aggravated because of the fact that downloading in itself may be a relatively slow process.

Furthermore, the installation process is inefficient in terms of memory (and thus cost), because it requires additional memory during the installation process. Installation of new software requires the remote control device to first download and store the new software in the additional memory, then verify the downloaded software and finally overwrite existing software in the memory of the remote control device. The additional memory is thus used primarily for downloading new software and is largely unused at other times, which makes the use of memory inefficient. Efficient use of memory is of particular importance a high-volume production process of small-memory devices, such as the remote control device, wherein memory size is kept to a minimum to reduce cost and bill-of-material.

SUMMARY OF THE INVENTION

The objective technical problem is to provide system, method and device for installing software on a small-memory device, having an improved efficiency as compared to the prior art.

An aspect of the invention is a device having a program memory being a memory for containing a computer program, a boot memory comprising a boot loader arranged for booting the device, a processor for running the computer program and the boot loader, a receiving unit for wirelessly receiving data packets, portions of the computer program being comprised by at least some of the respective data packets, the boot loader being further arranged for installing the computer program, comprising: detecting a data packet of the data packets, the detecting being part of receiving said data packet; extracting, from said data packet, at least one of (a) a portion of the computer program and portion metadata related to said portion and (b) program metadata related to a collection of portions collectively forming the computer program; determining a memory location in the program memory based on said portion metadata; maintaining progress information representing extracted portions that have been stored in the program memory; determining completion of storing the collection of portions based on the progress information and the program metadata.

The device may be a small-memory device such as a remote control, an electronic toy, a wearable device or, a music player, for example. Being effectively a small computer in itself, the device comprises the processor for executing a computer program and a boot loader. The device also comprises a program memory for storing the computer program. The device further comprises a boot memory comprising the boot loader for booting the device. The device also has a receiving unit for receiving the data packets.

The program memory may not have much more memory available than what is needed to store the computer program. For example the program memory is large enough to contain the computer program and at the same time may be (but does not need to be) too small to also contain an additional copy of the computer program. En the latter case, the program memory thus cannot contain the computer program and an additional copy of the computer program, so that the boot loader cannot first download the computer program before overwriting a previously installed computer program in the program memory. The computer program that needs to be installed may comprise new firmware for the device and also may include an updated database of settings, for example.

In addition to its typical task of booting the device, the boot loader is further arranged to install the computer program on the device. When being executed by the processor, the boot loader may function as follows. The boot loader uses the receiving unit to sniff for a wireless signal that comprises the data packet. When the data packet is detected, the boot loader may further receive the data packet via the receiving unit. The boot loader may then extract, from the data packet, a portion of the computer program and portion metadata related to the portion. Next, the boot loader may determine, based on the portion metadata, a memory location in the program memory for storing the portion. For example, the data packet may have a header comprising a relative memory location related to the portion. The boot loader may thus determine the (absolute) memory location in the program memory by adding the relative memory location to a predetermined starting memory location of the program memory. The portion may then be stored at the determined memory location.

The boot loader may proceed in a similar manner with other data packets until it determines that installation of the computer program has been completed. The installation of the computer program has been completed when the collection of portions collectively forming the computer program have been stored on the program memory, in other words, the installation has been completed when all portions collectively forming the computer program have been stored in the program memory. Having completed installation of the computer program, the boot loader may then further boot the device by executing the newly installed computer program.

The boot loader may extract, from a data packet, program metadata related to the collection of portions collectively forming the computer program. For example, the program metadata may comprise a number representing the total amount of portions that collectively form the computer program. Furthermore, the boot loader may maintain progress information representing extracted portions that have been stored in the program memory. For example, the boot loader may keep count of the number of portions it has installed in the program memory, the progress information thus being said count. The boot loader may determine completion of storing the collection of portions based on the progress information and program information. For example, when said count of stored portions matches the total amount of portions, the boot loader determines that all portions that collectively form the computer program have been stored in the program memory.

A data packet may comprise a portion and portion metadata related to that portion as well as program metadata. Alternatively, a data packet may comprise either (a) the portion and the portion metadata or (b) the program metadata. In the latter case, not every data packet comprises a portion of the computer program.

An effect of the invention is that the installation, by the boot loader, of the computer program on the small-memory device has an improved efficiency in terms of memory. The program memory requires being only sufficiently large to store the computer program. Additional space in the program memory to also store an additional copy of the computer program is not needed for installation of the computer program. The installation therefore has an improved efficiency in terms of memory.

Optionally, the boot loader is arranged for receiving a collection of data packets in a round-robin fashion, the collection of data packets collectively comprising the collection of portions, the collection of data packets being sent within a single round-robin period. All portions that collectively form the computer program may be received in a single round-robin period, but, if reception of some portions fails for some reason, these portions may be received during any next round-robin period. As a consequence, reception of the portion becomes robust for failed reception portions, preventing the device becoming 'bricked' because of failures during an installation. It also allows, in case of a failed installation, the device to be restarted so that the boot loader may restart the installation of the computer program.

Optionally, the collection of portions is consecutive portions consecutively forming the computer program and the portion metadata comprises information related to the rank of the portion in the consecutive portions. For example, the collection comprises 100 consecutive portions being portion #1, portion #2, . . . , up to portion #100. Then portion metadata of portion #60, for example, may be the number 60, representing the rank of portion #60 in the consecutive portions. The portions may thus be consecutively received according to their rank.

Another aspect of the invention is a system for installing a computer program on a device, comprising a host device being arranged for sending data packets, at least some of the data packets comprising respective portions of the computer program, the host device having a sending unit for wirelessly sending the data packets; a device having a program memory being a memory for containing a computer program, a boot memory comprising a boot loader that is arranged for booting the device, a processor for running the computer program and the boot loader, a receiving unit for wirelessly receiving the data packets, the boot loader being further arranged for installing the computer program, comprising: detecting a data packet of the data packets, the detecting being part of receiving said data packet extracting, from said data packet, at least one of (a) a portion of the computer program and portion metadata related to said portion and (b) program metadata related to a collection of portions collectively forming the computer program; determining a memory location in the program memory based on said portion metadata; maintaining progress information representing extracted portions that have been stored in the program memory; and determining completion of storing the collection of portions based on the progress information and the program metadata.

The system thus comprises the device comprising the boot loader (consistent with the device above being an aspect of the invention) and a host device. The host device may send the data packets that may be received by the device. For example, the system may be part of a production line for remote devices, and the host device may send packets comprising respective portions of new firmware to the device being a remote control device.

Optionally, the system comprises multiple devices according to the device, each of the multiple devices initiating the detecting at a respective different moment in time corresponding to a respective different initial portion of the collection of portions. An effect is that the installation has an improved efficiency in terms of speed when the computer program is being installed on the multiple small-memory devices. One of the multiple devices may perform its installation simultaneously with an installation of another one of the multiple devices in the vicinity. Each device does not require a paired connection with its respective own host device. Instead, the multiple devices may independently sniff and receive the same data packets from a same, single host device. Consequently, there is no limit to the amount of multiple devices that may install the computer program simultaneously, as long as the multiple devices are within range of the single host device so that they can receive the data packets. The speed of installing the computer program on the multiple devices therefore increases greatly as compared to the prior art.

Another aspect of the invention is a host device for use in the system, comprising a processor arranged for sending a collection of data packets in a round-robin fashion, each data packet of the data packets comprising a portion of a computer program, the collection of the data packets collectively comprising a collection of portions collectively forming the computer program, the collection of data packets being sent within a single round-robin period, and a sending unit for wirelessly sending the data packets. This allows the multiple devices to not only install the computer program in parallel, but also allows each of the multiple devices to start it installation at any time during a round-period or during a next-round robin period. This further increases efficiency for installation of the computer program on multiple devices, both in terms of speed as well as being more practical.

Another aspect of the invention is a computer program product comprising instructions for causing the processor of the host device to perform the following steps when the instructions are being executed by the processor: determining a portion from the computer program, determining portion metadata related to the portion, and composing a data packet comprising the portion and the portion metadata.

Another aspect of the invention is a method for installing a computer program on a device having a program memory being a memory for containing a computer program, a boot memory comprising a boot loader that is arranged for booting the device, a processor for running the computer program and the boot loader, and a receiving unit for wirelessly receiving data packets, portions of the computer program being comprised by at least some of the respective data packets, the method comprising: detecting a data packet of the data packets, the detecting being part of receiving said data packet; extracting, from said data packet, at least one of (a) a portion of the computer program and portion metadata related to said portion, and (b) program metadata related to a collection of portions collectively forming the computer program; determining a memory location in the program memory based on said portion metadata; maintaining progress information representing extracted portions that have been stored in the program memory; and determining completion of storing the collection of portions based on the progress information and the program metadata.

Another aspect of the invention is a computer program product comprising a boot loader comprising instructions that causes a processor to perform the method of claim 14 when the boot loader is executed by the processor.

BRIEF DESCRIPTION OF THE DRAWINGS

These and other aspects of the invention are apparent from and will be elucidated with reference to the embodiments described hereinafter.

In the drawings.

It should be noted that items that have the same reference numbers in different figures, have the same structural features and the same functions. Where the function and/or structure of such an item have been explained, there is no necessity for repeated explanation thereof in the detailed description.

DETAILED DESCRIPTION OF THE INVENTION

Figure 1A:
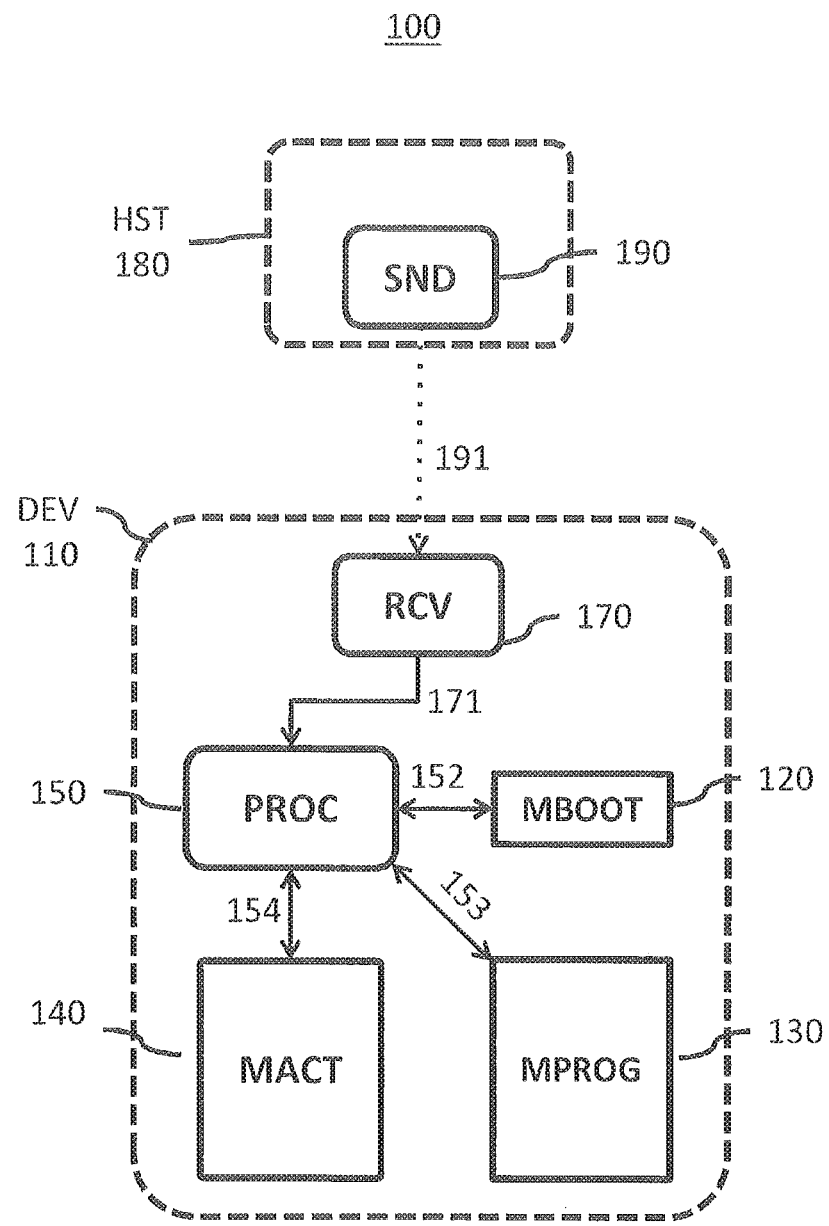
FIG. 1*a* illustrates a system for installing a computer program on a small-memory device.

FIG. 1*a* illustrates a system 100 for installing a computer program on a small-memory device DEV 110. The system 100 comprises a host device HST 180 (hereinafter: host HST) and the small-memory device DEV (hereinafter: device DEV). The host HST has a sending unit SND 190. The device DEV has a receiving unit RCV 170, a boot memory MBOOT 120, a program memory MPROG 130, an active memory MACT 140, and a processor PROC 150. The processor PROC may exchange data with the boot memory MBOOT, the program memory MPROG, the active memory MACT and the receiving unit RCV through connections 152-153 and 171, respectively.

The host HST may send the computer program via the sending unit SND 190 in portions, each portion being comprised by a respective data packet. The computer program as a whole is thus collectively comprised by a collection of data packets. The host HST sends a wireless signal 191 that may contain a data packet. The host HST May comprise other elements not shown in FIG. 1*a*, such as a processor, a host memory, and a network communication unit to connect to another network and/or the internet.

The host HST may have a computer program stored in its host memory and may determine data packets from the computer program as follows. The host HST first divides the computer program into consecutive portions. Said portions may differ in size or may be of equal size. The host composes a data packet by pre-pending a header to a portion. The header may include portion metadata related to the portion. For example, the header may comprise a packet identifier, a relative memory location for storing the portion, and a size (in bytes) of the portion comprised by the data packet. The header may instead include (or also include) program metadata related to a collection of portions collectively forming the computer program. For example, the program metadata may include the total number of portions that collectively form the computer program. Or, as another example, the program metadata may include the total size in bytes of the computer program.

In a embodiment, each data packet has a similar format and content. For example, each data packet may include a portion, related portion metadata and also the program metadata. In another embodiment, two types of data packets may exist. A data packet of a first type may contain a portion and related portion metadata, whereas a data packet of a second type may contain the program metadata. The host HST may send the data packet of the second type only occasionally, as the processor PROC does not need to receive the same program metadata in each consecutive data packet.

Consider the following example of a data packet. The packet identifier may be a number. A data packet that comprises the first portion of the computer program may have packet identifier being number 1. A data packet comprising the second portion may have packet identifier being number 2, and so on. The computer program may consist of 500 kilobytes divided in 500 portions of 1024 bytes (1 kb) each, for example, making the total number of data packets being 500. A collection of 500 data packets then collectively comprises all portions collectively comprising the computer program, and each data packet of the collection thus comprises a respective portion of the computer program. The relative memory location of a portion may indicate its location in the memory relative to a starting location in the program memory MPROG. For example, the data packet that comprises the first portion of the computer program may have relative memory location 0000 (zero), the data packet that comprises the second portion of the computer program may have relative memory location 1024, the third portion is then related to memory location 2048, etc. Furthermore, note that if the data packet header has fixed size of 64 bytes for example, then the size of the data packet becomes 1088.

Portions may be of the same size but may also differ in size. If all portions are of the same size, then the relative memory location of a portion may be computed in a straightforward way based on said size and the respective packet number: relative memory location is then computed as (packet number−1)×portion size. The relative memory location then need not be included explicitly in the header. Alternatively, the portions are of respective different sizes. In that case, computation of the relative memory location is less straightforward and it may thus be beneficial to include the relative memory location in the header.

Alternatively, the data packet may comprise an absolute memory location for storing the portion in the program memory MPROG rather than the relative memory location. The portion is then stored directly at the absolute memory location in the program memory MPROG.

The device DEV has the boot memory MBOOT which may be a non-volatile memory comprising a boot loader. The hoot loader consists of software that serves to boot the device DEV. Booting of the device DEV is performed as the processor PROC loads the boot loader into the active memory MACT and subsequently executes the boot loader. In addition to booting the device DEV, the boot loader in the present invention also comprises software functions to perform an installation of the computer program. Installation of the computer program comprises storing the computer program in the program memory MPROG being a non-volatile memory.

When executing the boot loader by the processor PROC, the device DEV may operate as follows.

As the processor PROC executes the boot loader, the device DEV starts 'sniffing' for data packets that are being sent by the host HST. Sniffing for data packets implies that the device DEV receives the wireless signal 191 via the receiving unit RCV and examines the wireless signal for the presence of a data packet. For example, the processor may detect the data packet by detecting a predetermined data sequence that marks the beginning of any data packet from the host HST. The device DEV may then receive the entire data packet. For example, each data packet may be limited to a predetermined number of bytes, so that the processor DEV is required to receive said predetermined number of bytes from said beginning of the data packet, in order to receive the entire data packet.

The data packet may be written in the active memory MACT. The data packet may have a fixed header size and the processor PROC may extract the header from the data packet. The header may include a size of the portion (e.g. the portion consists of 1024 bytes), so that the processor PROC may determine the memory locations in the active memory containing the portion. The processor PROC may then read the portion from the active memory MACT. The processor PROC has then extracted both the header and the portion from the data packet.

Embodiments above include the active memory MACT being a volatile memory, although technically it may also possible be to use a non-volatile memory instead. At present, a volatile memory is typically preferred for many applications because of a much higher speed of reading from or writing to the volatile memory as compared to a non-volatile memory. Yet, due to hardware innovations, future non-volatile memories are naturally expected to have a higher speed compared to present non-volatile memories. For some embodiments, the speed of the future non-volatile memory may become acceptable for use in the active memory MACT. An example of such an embodiment using a future non-volatile memory may possibly be the device DEV being remote control device for controlling a consumer device.

In order to verify the integrity of the data packet, the header may also include a packet checksum. The processor PROC may verify whether the packet checksum and received data packet are consistent. If this is not the case, the processor PROC may conclude that received the data packet is corrupted and, in response, may abort further processing of said data packet. The processor PROC may then proceed by sniffing for another data packet. The processor PROC may also extract a relative memory location from the header, as mentioned above. The processor PROC may then determine an absolute memory location in the program memory MPROG for storing the portion. Said absolute memory location may be determined by adding the relative memory location to a predetermined starting memory location in the program memory. The processor PROC may then store (write) the extracted portion at said absolute memory location in the program memory MPROG.

It should be noted that, in what follows, 'storing a portion in the program memory MPROG' will also be referred to as 'installing a portion'. In a similar way, the computer program has been 'installed' when all portions collectively forming the computer program are stored in the program memory MPROG, each portion being stored at its appropriate memory location in the program memory MPROG.

After or during installing the portion, the processor PROC may proceed by sniffing for a next data packet and repeating the process above for said next packet. The processor PROC may continue the process of receiving a data packet and installing a respective portion until all portions that collectively form the computer program are installed. Installing the computer program on the device DEV is then completed.

Determining completion of storing all portions may work as follows. The processor PROC may keep track of all portions of the computer program that have been installed. Consider the following example. The processor PROC determines from a header of a data packet that the total amount of portions is 500. The program metadata thus comprises said total amount being 500. The processor PROC may then keep track by maintaining a list of 500 flags: each flag corresponds to a packet number and states whether a corresponding portion has already been installed. For example, flag #25 corresponds to packet number #25 and states whether portion #25 has been installed. The program metadata thus comprises the packet number #25, which therefore represents the rank 1125 of the portion the consecutive portions #1-11500, Before installing the first portion, the list is initialized by setting all flags of the list to 0 (zero). Then, each time the processor PROC installs a portion, it sets a corresponding flag of that portion to 1 (one). The processor PROC determines that all 500 portions have been installed, upon determining that all flags of said list are set to 1.

Alternatively, the program metadata comprises the total number of bytes comprised by the computer program. The processor PROC may keep count of the cumulative number of bytes of the portions that have been stored in the program memory MPROG. Upon installing the last portion such that the cumulative number of bytes matches said total number of bytes, the processor PROC may determine that all portions collectively forming the computer program have been stored in the program memory MPROG.

The host HST may send the portions in a so-called round-robin fashion. This implies that the host HST sends all portions in a periodic manner. Consider the following example, again involving a total amount of portions being 500. The 500 portions correspond to a total amount of 500 respective data packets. Sending the 500 data packets in a round-robin fashion implies that the host HST sends all 500 data packets consecutively in a single round-robin period, and then proceeds with the next round-robin period wherein the host HST again sends all data packets consecutively. In a round-robin period, the twist HST first sends data packet #1, then sends data packet #2, then sends data packet #3, and so on. After sending data packet #500, the host HST starts the next period by sending again data packet #1, then # data packet #2, etcetera.

Consequently, the device DEV may receive the portions in a round-robin fashion also, and consequently may also install the respective portions accordingly in a round-robin fashion. The device DEV may start sniffing and receiving at any phase in the round-robin period. For example, the device DEN receives its first data packet being data packet 4100, comprising portion 4100. Thus, if the device DEV receives and installs the portions consecutively sent by the host HST, the device DEV first installs portions #100 to #1500 during the first round-robin period, and then portions #1 to #99 during the second round-robin period.

If the device DEV, for some reason, fails to receive and/or install a data packet during the first round-robin period, it may simply receive and install that data packet during a next round-robin period, Continuing with the previous example, if the device DEV fails to receive data packet 11200 during the first round-robin period, the next round-robin period will proceed as follows: the device DEV installs portions #1 to #99 (as above), then skips portions #100 to #199, and finally receives and installs portion #200.

Figure 1B:
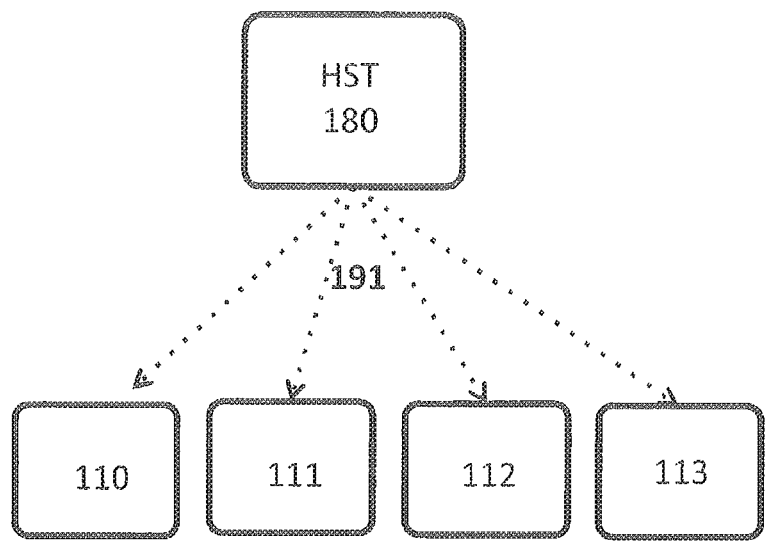
FIG. 1*b* illustrates the system comprising multiple small-memory devices.

FIG. 1*b* illustrates a system 199 comprising multiple small-memory devices 110-113. The system 199 effectively consists of the system 100 and three additional (small-memory) devices 111-113. Installing the portions in a round-robin fashion is particularly useful in the system 199 having multiple devices 110-113. Each of the multiple devices 110-113 may start receiving data packets at a different phase of the round-robin period (or of a next round-robin period for that matter). Yet, each of the multiple devices 110-113 may simultaneously receive the same data packet from the same, single host HST and subsequently install the respective same portion. There is no limit to the amount of (small-memory) devices that may be added to the system 100 or system 199, as each of the devices receives and installs a portion from the host HST in parallel. The only requirement is that each of the multiple devices is within range of the host HST in order to receive data packets sent by the host HST. This presents a great benefit in the sense that it speeds up installing the computer program on the multiple devices being a large group of devices.

Figure 2A:
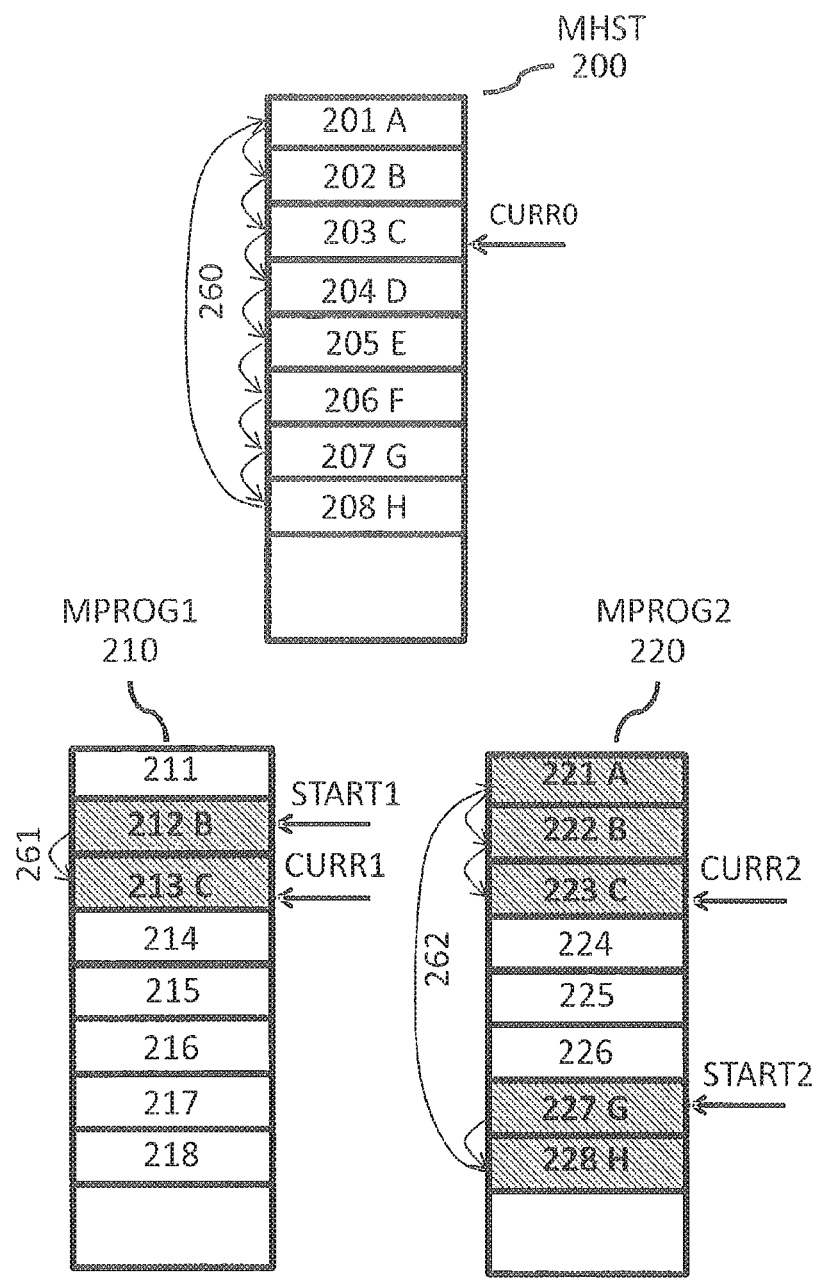
FIG. 2*a* illustrates memories of two small-memory devices and a memory of the host device during round-robin installation of a computer program.

FIG. 2*a* illustrates a host memory MHST 200 and two program memories MPROG1 210 and MPROG2 220 during a round-robin installation of the computer program. The program memories MPROG1 and MPROG2 are memories of two small-memory devices DEV1 and DEV2, respectively. The host memory MHST is a memory of the host HST. The host memory MHST contains the computer program in the form of (eight) portions A-H at respective memory locations 201-208, The portions A-H collectively form the computer program. The host HST may send portions A-H in a round-robin fashion. The devices DEV1 and DEV2 may then receive and install the portions from the host HST in their respective program memories MPROG1 and MPROG2.

The host HST has a current reading position at memory location 203 of its host memory MHST. The current reading position is indicated by pointer CURR0. The host HST reads portion C, composes a data packet containing portion C and (a header having) a relative memory location, and sends the data packet via the sending unit SND.

The device DEV1 receives the data packet and extracts (a) the portion and (b) the relative memory location. The device DEV1 determines an absolute memory location 213 by adding the relative memory location to its starting memory location 211. For example, the starting memory location has a value 128 and the relative memory location has a value 2048, so that the value of the absolute memory location becomes 2176. Consequently, the device DEV1 sets its current writing position to the absolute memory location, indicated by a pointer CURR1, and then stores (writes) the portion C at memory location 213 of its program memory MPROG1. The device DEV2 performs a similar process: device DEV2 receives the data packet, determines an (absolute) memory location 223, and stores the portion C at the memory location 223. The pointer CURR2 indicates the current writing position of the device DEV2.

The host HST sends the portions in a round-robin fashion, indicated by the arrows 260. In present example, the host HST has just sent portion C. The next portion to be sent by the host HST will thus be portion D, and after that portion E, and so on. After having sent portion H, the host HST will then proceed by sending portion A again.

After DEV1 first started sniffing, the host HST sent portion B, only just before sending the current portion C within the same round-robin period. The device DEV1 has therefore first detected a data packet comprising portion B, and consequently portion B is the first portion installed by DEV1. In this example, the device DEV1 has now installed portions B and C. The pointer START1 indicates that the first portion is stored by device DEV1 at its memory location 212. The pattern-filled areas in program memory MPROG1 indicate that portions B and C have been stored at memory locations 212 and 213, respectively. Arrow 261 indicates that DEV1 installed portions in the order B, C.

DEV2 has first started sniffing during the previous round-robin period, just before the host HST sent portion G. The device DEV2 has therefore first detected a data packet comprising portion G, and consequently portion G is the first portion installed by DEV2. In this example, the device DEV2 has now installed portions G, H, A, B and C. The pointer START2 indicates that the device DEV2 stored its first portion at memory location 227. The pattern-filled areas in program memory MPROG2 indicate that portions G, H, A, B and C have been stored at memory locations 227, 228, 221, 222 and 223, respectively. The arrows 262 indicate that DEV2 installed the portions in the order G, H, A, B, C.

Figure 2B:
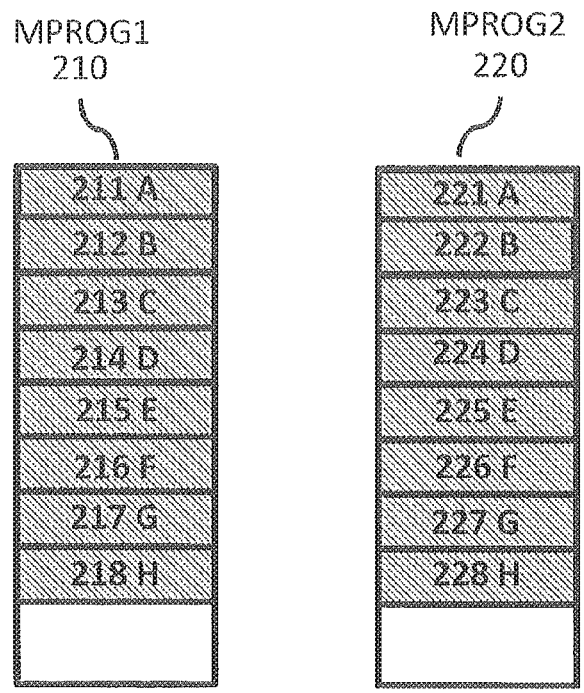
FIG. 2*b* illustrates the memories of the small-memory devices upon completion of installing the computer program.

DEV1 still has six portions 'to go', thus DEV1 still needs to install portions D-H and A, in order to complete the installation of all portions A-H. DEV2 has only three portions 'to go', thus DEV2 still needs to install portions D-F, in order to complete installation of all portions A-H. If devices DEV1 and DEV2 both receive and install the next portions sent by the host HST in the round-robin fashion, then DEV2 will complete installation of all portions before DEV1 does. FIG. 2b illustrates program memories MPROG1 and MPROG2 upon completion of installing the computer program. Both memories MPROG1 and MPROG2 comprise all portions A-H in their respective memory locations 211-218 and 221-228, respectively.

Figure 2C:
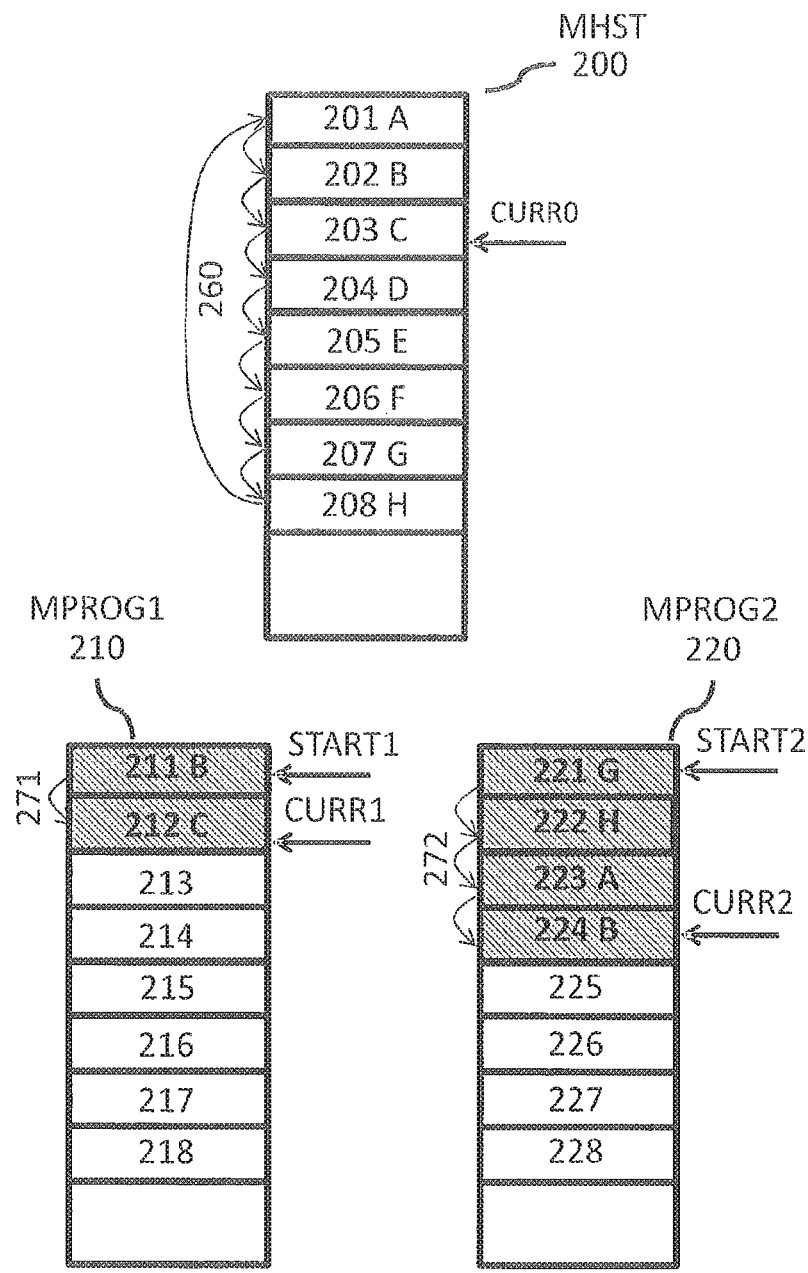
FIG. 2*c* illustrates memories of small-memory devices and the host device during an alternative round-robin installation of a computer program.

FIG. 2c illustrates two program memories MPROG1 210, MPROG2 220 and a host memory MHST 200 during an alternative round-robin installation of the computer program. In FIG. 2c, the host HST and its host memory MHST is identical to that of FIG. 2a. A difference with the situation of FIG. 2a is that the devices DEV1 and DEV2 have started storing portions at their starting memory locations 211 and 221, respectively. The devices DEV1 and DEV2 store successive portions at successive memory locations in their respective program memories MPROG1 and MPROG2 according to the order of receiving the portions. The device DEV1 thus stores next portions D-H and A at respective successive memory locations 213-218. Likewise, the device DEV2 thus stores successive portions D-F at respective successive memory locations 225-228. After having stored all portions A-H, the devices DEV1 and DEV2 reorder the portions within their respective program memory MPROG1 and MPROG2 afterwards, such that the order of the portions becomes according to FIG. 2b.

Figure 2D:
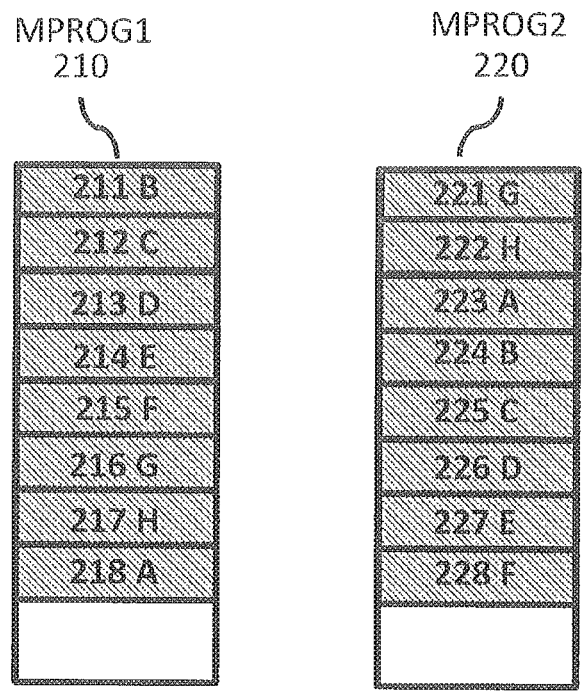
FIG. 2*d* illustrates the memories of the small-memory devices upon storing the last portion of the computer program before reordering the portions.

FIG. 2d illustrates the two program memories MPROG1 and MPROG2 after storing all portions of the computer program and before reordering the portions. Upon determining that all portions A-H have been stored in its memory, the device DEV1 reorders the portions such that the portions A-H are stored in its program memory MPROG1 as depicted in FIG. 2b. Likewise, upon determining that all portions A-H have been stored in its memory, the device DEV2 reorders the portions such that the portions A-H are stored in its program memory MPROG2 as depicted in FIG. 2b.

In FIG. 2d, the devices DEV1 and DEV2 determine an absolute memory location for storing a portion differently than in FIG. 2a. For example, for the first portion B, the device DEV1 determines that the absolute location for storing portion B is the starting memory location 211. After receiving the next portion C, the device DEV1 determines that the absolute memory location for storing portion C is the next memory location, being the memory location 212. Similarly, next portions D-H and A are stored at next memory locations 213-218, respectively. The device DEV1 may maintain a list of packet numbers and respective memory locations representing the order in which the portions are stored in the program memory MPROG 1. In this case, said list indicates that portions are stored in the order B, C, D, E, F, G, H, A (as shown in FIG. 2d). Based on the information in said list, the device DEV1 may then: move portion A from memory location 218 to memory location 211, move portion B from memory location 211 to memory location 212, move portion C from memory location 212 to memory location 213, etcetera.

The order in which the host HST sends the portions in a round-robin fashion is typically as described above. A typical order of sending the portions within a round-robin period is A, B, C, D, E, F, G, H. Alternatively, the order of sending the portions may be different from said typical order. For example, the order may be reversed or randomized. For example, as a result of randomizing the order, the host may send the portions in one round robin period in the order E, D, A, C, G, B, H, F, whereas the host may send the portions in another order B, F, G, E, D, H, C, A in another round-robin period.

Installation of the computer program may be initiated in various ways. For example, the boot loader may cause the device DEV to start sniffing for a data packet when the boot loader is being executed. The boot loader may have a predetermined time-out period, so that when no data packet is detected within said time-out period after starting the sniffing, the device DEV aborts the sniffing and proceeds with booting the device DEV. In contrast, if a data packet is detected within said time-out period, the device DEV installs a portion comprised by the data packet, and starts sniffing for a next data packet.

As another example, the boot loader may cause the device DEV to verify whether a valid computer program is stored in the program memory MPROG, and may start sniffing upon determining that no valid computer program is installed. As another example, the boot loader may cause the device DEV to verify whether any computer program to operate the device is stored in the program memory MPROG. The device DEV may start sniffing upon determining that no computer program is installed, upon determining that the program memory is 'empty' (e.g. filled with zeros only).

As another example, the boot loader causes the device DEV to initiate the sniffing upon detecting that an installation flag is set to an installation status. When the installation flag is set to an installation status, it represents that installation of the computer program is required. When the installation flag is set to a non-installation status, it represents that installation of the computer program is not required. The installation flag may be part of the device DEV. The installation flag may be set to the installations status in response to an external input. For example, if the device DEV is a remote control device, the external input may be provided by a user who punches in a predetermined code on the remote control device, causing the remote control device to (a) set the installation flag to the installation status and to (b) perform a reboot. As mentioned above, the device DEV then detects during the (re)booting that the installation flag is set to the installation status and, in response, starts sniffing for a data packet. Upon completing installation or the computer program, the device DEV may set the installation flag to the non-installation status. Alternatively, the external input may be provided via a manual switch on the device DEV representing the installation flag. A user may manually set the manual switch into a first position or a second position. The first position may correspond to the installation status and second position may correspond to the non-installation status.

It should be noted that, in the context of the present invention, when the device DEV 'starts sniffing for a data packet' it implies that the device DEV has started installing the computer program, and that having installed the computer program implies that the computer program is stored in the program memory MPROG.

For security purposes, the data packet may comprise encryption. For example, the host HST may encrypt a portion of the computer program and compose a data packet using the header and the encrypted portion. The device DEV may receive the data packet, extract the encrypted portion from the data packet, and obtain the portion by decrypting the encrypted portion. The encryption may ensure that only the device DEV or similar devices may receive and install the portion.

In an embodiment, the device DEV is a remote control device in a production facility that produces remote control devices. The production facility may comprise a production line having the remote control devices in various states of production. At the end of the line, each remote control device requires an installation of the latest firmware. In a similar setting as schematically illustrated by FIG. 1b, a host HST is in the vicinity of the production line such that multiple remote control devices may receive data packets sent by the host HST. The host HST may be a personal computer or some dedicated device for sending the data packets; for example. In order to minimize the risk of interference with other equipment in the production facility, the host HST and the remote control devices may use communication or frequency band not used by the other equipment. However, mutual interference between the multiple remote control devices is not an issue, because the multiple remote devices are only receiving and receive the data packets in parallel from the same host HST.

In an embodiment, the device DEV has an indicator for providing feedback upon completion of installing the computer program. For example, the device DEV has a LED that flashes upon said completion. As a variant, said LED changes its color from red to green upon said completion. As another example, the device DEV has a speaker to generate a notification or alarm upon said completion. As another example, the device DEV may have a means for vibrating upon said completion.

In an embodiment, the device DEV is a lamp that is wirelessly controllable, such as the 'Hue Personal Wireless Lighting' product produced by Philips. Lighting properties of the lamp may be controlled by a central control box or the lamp may controlled directly by a smart phone. The central control box may comprise the host HST as described above. A user may wish to control brightness, hue and/or saturation of each lamp separately or of all lamps jointly. Typically, a living room will have multiple of such wireless controllable lamps. When the central control box may detect that new firmware is available for the multiple lamps, it may initiate a firmware upgrade as follows. The central control box sends a version number of the new firmware to each lamp and, in response, each lamp checks whether the version number of the new firmware matches a version number of its installed firmware. In the case that a lamp of the multiple lamps detects that its firmware is not up-to-date, said lamp may communicate back to the central control box that it will initiate installation of the new firmware; said lamp sets its installation flag to 'installation status' and performs a reboot. Upon the reboot, said lamp then starts sniffing for data packets from the central control box. Similarly, other lamps that also have outdated firmware may do the same and, in parallel, also reboot and initiate installation of the new firmware. As the central control box has received from at least one lamp that it initiates installation of the new software, it downloads the new firmware, for example from the manufacturer's website. The central control box then starts sending data packets comprising the new firmware. Said lamp then detects and receive the data packets sent by the central control box and start installing the firmware according to the invention.

As a variant of the previous embodiment, a new lamp may be added to said multiple lamps in the living room and may check whether its firmware is up-to-date. The new lamp is mounted in an armature and is thus electrically powered via said armature. Upon being powered, the new lamp may wirelessly contact the central control box. In a similar way as in the previous embodiment, the central control box communicates the latest firmware that has been installed on the other lamps of the multiple lamps, and in the case that the new lamp's firmware is not up-to-date, the central control box and the new lamp start installing the new firmware according to the invention.

In an embodiment, a retail store has multiple small-memory devices being media players. The retailer may wish to install the latest firmware on all media players on the shop floor. The retailer has a smart phone arranged to function as the host HST. The latest firmware may be downloaded onto the smart phone, and the smart phone may start sending portions of the computer program in a round-robin fashion. By powering a media player, the media player may reboot (thus execute the boot loader), then initiate sniffing as a part of the boot loader, and subsequently receive and install the portions. As the smart phone keeps sending the portions in a round-robin fashion, the media players may be powered on one-by-one, and each media player may initiate installing the firmware at a different phase of a round-robin period and/or even in a different round-robin period. Installations of the respective media players thus need not be in sync, which makes the entire procedure practical. Such a procedure for updating firmware is convenient, because of its wireless and automatic nature. Furthermore, the procedure is also fast because updating the firmware on the media players is done in parallel.

The device DEV may be any small-memory device according to the invention. Many such devices nowadays have a radio capability to connect to other devices, for example; in a home environment, a medical environment, or inside a car. Devices may thus become interconnected and may interact with each other and/or with a user in a local network of devices and/or with the internet, for example. Examples of the small-memory device DEV area remote control device, a wirelessly controllable lamp (e.g. as above), a media player, a portable media player, an electronic toy, a digital watch, a kitchen appliance, a kitchen apparatus such as refrigerator or an oven, and a wearable electronic. The device DEV may be a device for medical purposes, such as a blood saturation meter, a wearable heart beat monitor, or another small-memory device monitoring a physiological or physical parameter of a patient. As yet another example, the device DEV may be a wirelessly controllable digital tag, e.g. serving as a name tag for personal identification or as a price tag for showing prices at a retail store.

The wireless technology used by the host HST and the device DEV may be any appropriate wireless technology, such as RF4CE, Zigbee, WiFi, or a variant of BlueTooth that does not require pairing. It should be noted that a benefit of the present invention is that the boot loader may be very simple in the sense that installation of the computer program by the boot loader may work on so-called MAC-level, thus not requiring RF4CE software stack in the boot loader.

Although it has been mentioned above that the program memory MPROG may be small in the sense that it is insufficiently sized to contain both the computer program and also a copy of the computer program at the same time. Yet, the invention will obviously also work when the program memory MPROG is large, such that it is sufficiently sized to contain both the computer program and said copy. In an embodiment, the program memory MPROG is indeed large, but nevertheless only a small part of the program memory MPROG may be available because the remainder of the being used for other purposes.

The host HST may run software comprising instructions for composing a data packet. The software may be embodied on a computer program product, such as a CD-ROM or a solid state memory. The computer program product may comprise instructions for causing the processor of the host. HST to perform the following steps when the instructions are being executed by the processor: determining a portion from the computer program, determining portion metadata related to the portion, and composing a data packet comprising the portion and the portion metadata.

Figure 3:
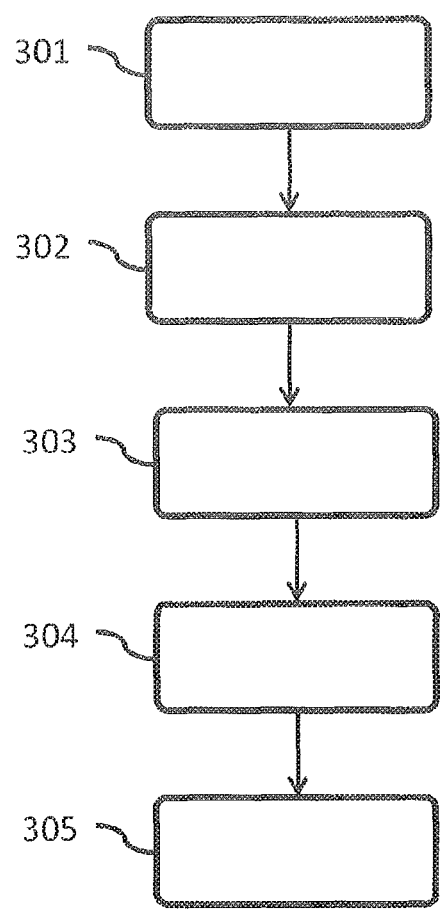
FIG. 3 illustrates a method for installing a computer program on the small-memory device.

FIG. 3 illustrates a method 300 for installing a computer program on the small-memory device DEV. The method 300 comprises the steps 301-305. Step 301 comprises detecting a data packet of the data packets, the detecting being part of receiving said data packet. Step 302 comprises extracting, from said data packet, at least one of (a) a portion of the computer program and portion metadata related to said portion, and (b) program metadata related to a collection of portions collectively forming the computer program. Step 303 comprises determining a memory location in the program memory based on said portion metadata. Step 304 comprises maintaining progress information representing extracted portions that have been stored in the program memory. Step 305 comprises determining completion of storing the collection of portions based on the progress information and the program metadata. Method 300 is consistent with steps that may be performed in the system 100 and by the device 100.

Method 300 may be embodied on a computer program product. Said computer program product comprises the boot loader comprising instructions that causes the processor PROC to perform the method 300 when the boot loader is executed by the processor PROC. The computer program product may be a CD-ROM or a solid state memory, for example. It should be noted that the above-mentioned embodiments illustrate rather than limit the invention, and that those skilled in the art will be able to design many alternative embodiments without departing from the scope of the appended claims. It will be appreciated by those skilled in the art that two or more of the above-mentioned embodiments, implementations, and/or aspects of the invention may be combined in any way deemed useful.

Modifications and variations of the system, device, host device, method or the computer program product, which correspond to the described modifications and variations of the monitoring subsystem, can be carried out by a person skilled in the art on the basis of the present description.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device (or system) claim enumerating several means, several of these means may be embodied by one and the same item of hardware. The mere fact that certain measures are recited in mutually different dependent claims does not indicate that a combination of these measures cannot be used to advantage.

The invention is defined in the independent claims. Advantageous yet optional embodiments are defined in the dependent claims.

The invention claimed is:

1. A system for installing a latest version of a computer program on a plurality of remote control devices during production of the remote control devices,
   (a) the system comprising a host device, the host device including a host processor and a wireless sending unit, wherein the host device is configured to:
      wirelessly broadcast a latest version number of the latest version to each remote control device;
      wirelessly receive at least one installation initiation communication from at least one of the remote control devices; and
      upon receipt of at least one installation initiation communication, arrange for a plurality of data packets comprising respective portions of the latest version and wirelessly send the data packets;
   (b) each remote control device comprising:
      a first non-volatile memory for storing a program memory, wherein the program memory contains a current version of the computer program having a current version number,
      a second non-volatile memory for storing a boot memory, wherein the boot memory comprises a boot loader arranged for booting the remote control device,
      a processor and an active memory for running the current version of the computer program and separately running the boot loader,
      a receiving unit for wirelessly receiving from the host device, wherein:
         during the running of the current version of the computer program, the remote control device is configured to receive a latest version number from the host device and determine if the current version number is up-to-date with the latest version number, wherein if the current version number is not up-to-date:
            the remote control device communicates back to the host device that the remote control device will initiate installation of the latest version of the computer program upon a reboot of the remote control device;
            the remote control device sets an installation status flag; and
            the remote control device commences the reboot; and
         during the running of the boot loader, the device is configured to receive from the host device a plurality of data packets including: (i) the latest version of the computer program, and (ii) program metadata related to the latest version of the computer programs, wherein the boot loader is further arranged to install the latest version of the computer program by steps of:
            detecting each data packet, the detecting being part of receiving each data packet;
            extracting, from the data packets the latest version of the computer program and the program metadata;
            storing each successive portion of the latest version of the computer program in the program memory at successive memory locations in the first non-volatile memory, thereby successively overwriting portions of the current version of the computer program stored in the first non-volatile memory, wherein the successive portions of the latest version of the computer program are arranged in the first non-volatile memory based on the program metadata; and upon completion of storing the latest version of the computer program in the first non-volatile memory, resetting the installation status flag and providing an indicator of successful installation of the latest version;

wherein the first non-volatile memory:
- is sufficiently sized to contain the current version of the computer program; and
- is insufficiently sized to contain both the current version of the computer program and the latest version of the computer program; and wherein the active memory:
- is sufficiently sized to run the current version of the computer program or the boot loader with the processor; and
- is insufficiently sized to both run the current version of the computer program or boot loader with the processor while simultaneously storing the latest version of the computer program.

2. The system of claim 1, wherein the boot loader is arranged for receiving a collection of data packets in a round-robin fashion, the collection of data packets being sent within a single round-robin period, and the boot loader starting to receive the collection of data packets at any phase of the single round-robin period based on the single round-robin period being continuously repeating.

3. The system of claim 1, wherein the boot loader is arranged to abort installing upon not having detected a data packet within a predetermined time-out period after initiating the detecting.

4. The system of claim 1, wherein the boot loader is arranged to decrypt the data packets.

5. The system of claim 4, the remote control device being embodied in one of a remote control device, a wirelessly controllable lamp, a media player, an electronic toy, a kitchen appliance, a wearable electronic device, and a medical device.

6. The system of claim 4, wherein the indicator of successful installation of the latest version is a change of color of an LED, a sound alarm, or a vibration.

* * * * *

UNITED STATES PATENT AND TRADEMARK OFFICE
CERTIFICATE OF CORRECTION

PATENT NO.         : 10,642,591 B2
APPLICATION NO.    : 15/304684
DATED              : May 5, 2020
INVENTOR(S)        : Ow et al.

Page 1 of 1

It is certified that error appears in the above-identified patent and that said Letters Patent is hereby corrected as shown below:

In the Claims

In Claim 5, Column 18 Line 14 delete "claim 4" and insert --claim 1--;

In Claim 6, Column 18 Line 19 delete "claim 4" and insert --claim 1--.

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*